Tom F. Smith
INVENTOR.

March 27, 1962  T. F. SMITH  3,026,770
CURVED PROJECTION SCREEN
Filed April 2, 1958  3 Sheets-Sheet 2

Tom F. Smith
INVENTOR.

March 27, 1962 — T. F. SMITH — 3,026,770
CURVED PROJECTION SCREEN
Filed April 2, 1958 — 3 Sheets-Sheet 3

Tom F. Smith
INVENTOR.

United States Patent Office 3,026,770
Patented Mar. 27, 1962

3,026,770
CURVED PROJECTION SCREEN
Tom F. Smith, % General Delivery, Arlington, Mo., assignor of fifty percent to Rowe E. Carney, Jr., Rolla, Mo.
Filed Apr. 2, 1958, Ser. No. 725,946
8 Claims. (Cl. 88—28.90)

This invention relates to projection screens and more specifically to projection screens used for wide angle picture projection which are curved and cover an angle which is larger than the angle encompassed by the conventional projection produced by means of a standard projector.

Wide angle projection has been introduced because pictures extending over an angle of 135° to 180° or even to a larger angle produce for the spectator a more realistic impression, giving the illusion of being in the midst of the scene appearing on the screen.

Screens of these types show however some specific noticeable disadvantages due to the fact that the light thrown on the screen from the projector is not in its entirety reflected towards the audience or towards the space in front of the screen. Usually the audience is seated in front of the projector between the latter and the screen and this entails a curvature of the screen, the center of which does not coincide with the position of the projector. Some of the light rays impinging upon the screen are thus reflected at an angle which is not sufficiently close to the incident rays to avoid the lateral portions of the screen.

The reflected rays striking another portion of the screen produce however two undesirable effects; one of these consists in producing a "burning spot" on the portion of the screen hit by the reflected rays for the onlooker, and the second disturbing effect consists in illuminating all the shadows of the projection picture hit by reflecting rays, thus reducing the contrast between lights and shadows of the projection picture. On this contrast however the quality of the picture largely rests. Further, with colored pictures in addition a considerable color deterioration occurs.

The second effect occurs also when the light reflected from one portion of the screen to another portion is not concentrated on any narrow portion but is merely scattered.

It has therefore been necessary to use some means reducing this effect. It has been proposed in connection with curved screens and especially in connection with spherical screens to subdivide the screen into separate areas. More specifically it has been proposed to make a screen consisting of louvres the slats of which are oriented in the proper direction to avoid reflection towards the interior of the screen. This however greatly complicates the construction of the screen increasing the manufacturing costs.

For a different purpose and also for different reasons, and more specifically in order to allow the production of stereoscopic pictures without viewing apparatus, screens have been constructed with plural projection surfaces in order to allow the showing of a picture taken by the righ hand lens of a stereoscopic camera only to the right eye, while a picture taken through the left hand lens of the camera is only visible to the left eye of the onlooker. This simultaneous projection of two different images which cannot be simultaneously seen with both eyes has been accomplished by providing the screen with a series of protruding ridges or a series of receding grooves with faces turned into two different directions towards the two eyes of a spectator. Screens of this type must however essentially be flat screens and moreover the manufacturing of such a screen is rather complex. They are solely effective for a very small audience which has to be concentrated on a certain spot.

According to the invention the reflection of light from one portion of a curved and especially from a semi-circular cylindrical screen to another portion of the same screen is prevented without impairing the efficiency of the screen projection by providing the screen with corrugations, projections or grooves running in substantial parallelism with the axis of the cylinder of which the screen forms a sector which corrugations protrude outwardly and/or inwardly from the cylindrical surface, said corrugations being made in part reflective and in part unreflective by providing that part of the corrugations which reflects light coming from the projection apparatus towards the screen with a nonreflecting light absorbing surface.

The principle on which the effectiveness of such a screen, the curved or cylindrical surface of which is provided with a large number of projections and grooves or corrugations, rests, will be best understood when considering the fact that each corrugation or projection necessarily contains surfaces which reflect in the desired direction namely towards the space in front of the screen and other surfaces which reflect in the prohibited direction namely towards other parts of the screen. The large number of corrugations therefore distributes the portions reflecting in the undesired direction over the entire screen, narrowing however each single portion down to a small vertical strip limited on both sides by the strip-like portions reflecting in the desired direction.

If those portions which would reflect towards the screen are made non-reflective—either by a coating or by suitably selecting the material from which they are made—reflection towards the screen is suppressed, but the full extent of the cylinderical or otherwise curved screen is available for reflection. While it is true that the portion of the screen reflecting towards the audience now consists only in reflective strips, the diminution of the available surface for reflection in the desired direction is compensated and frequently overcompensated by the increase of screen surface due to the corrugation. The sum total of the area covered by reflective strips is usually larger than the arc of the simple circular cylindrical surface and the non-reflective strips between the reflecting strips are sufficiently narrow to escape notice. The efficiency of the screen is thus not diminished but may even be enhanced.

The invention may be carried into effect by using preferably corrugations with curved walls forming either a wavy line or a series of curved ridges or ribs or a series of stepped ratchet teeth like projections or grooves, presenting two surfaces differently inclined towards the central plane of symmetry, or forms of teeth with curved backs may be selected.

The invention is illustrated in the accompanying drawings showing several modifications thereof. It is, however, to be understood that the modifications shown are illustrative only showing the invention by way of example and diagrammatically; the drawing does not intend to show a survey of possible modifications. A departure from the modifications illustrated in the drawings is therefore not necessarily a departure from the essence of the invention.

In the drawings all figures show diagrammatically a sectional plan view with a horizontal section either through a screen covering approximately 180° or through a section of such a screen.

Figure 1:
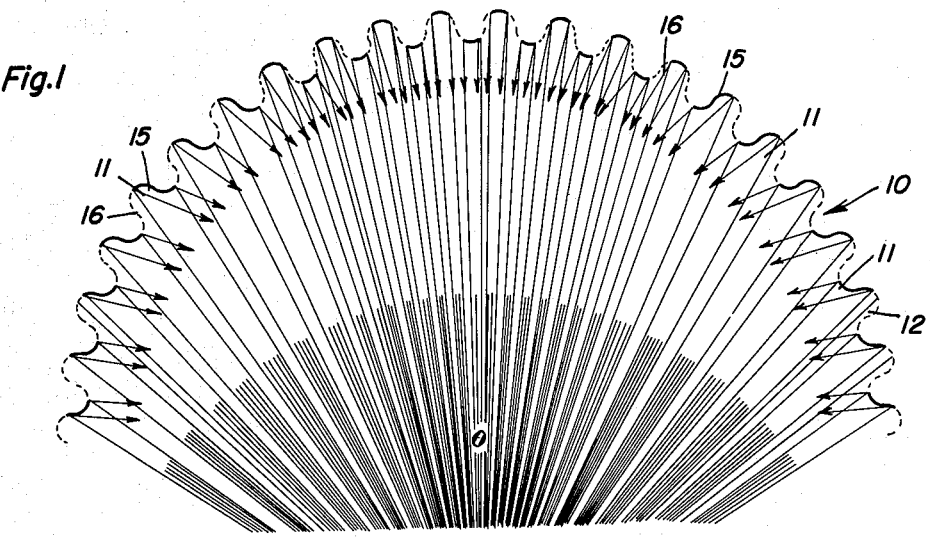
FIGURE 1 illustrates diagrammatically a plan view with a section through a screen covering approximately 180° provided with corrugations which have approximately the shape of semi-circles joined to each other so as to produce a wavy or sinusoidal line. The scale at which the corrugations are shown is however greatly exaggerated.

The general principle of the invention may best be explained in connection with a screen such as shown in FIGURE 1.

The screen 10 may be made of conventional material and is of cylindrical type. In the example shown the screen covers an arc of approximately 180°, but screens having a smaller or a larger arcuate extension may be used, the arc to be covered being selected in accordance with the special conditions under which projection takes place.

A screen of this type is always used in connection with a special projection system, producing wide angle projection pictures, either by using a special projector or by using a plurality of projectors, or special lenses or special films. As will be seen in FIGURES 1 and 2, the screen 10 while curved along a cylindrical surface with a circular base does not present a smooth semicircular cylindrical surface, but is provided with corrugations 11 and 12 which may be of sinusoidal shape or which may consist of a series of semi-circles alternatively projecting outwardly and inwardly from the basic circle. These corrugations are joined to produce an approximately semi-circular wavy line.

Such a screen has a very much enlarged surface when compared with a simple cylindrical surface and this surface enlargement considerably increases the efficiency of the screen. However this increase of efficiency without the invention would be accompanied by the disadvantages explained below.

The ideal location for the projector as well as for the observer is the point O located in the axis of the cylinder formed by the screen 10. The audience is therefore placed on both sides of this point behind the same. The view of the projection picture becomes however progressively distorted with increased distance from the plane of symmetry so that the area in which the audience may be seated is limited by optical conditions The projector is not located at this ideal point but generally is located at a point P in the rear of the point O in the plane of symmetry.

The distance of the projector from the center of the screen varies considerably in accordance with the outlay of the theatre in which projection takes place. For the purpose of testing the efficiency of the screen it is usually assumed that the projector is arranged at a distance of about one-half of the screen radius from the center of the screen. Within the limits practically imposed larger distances do not produce materially different conditions.

With a simple cylindrical screen the rays from the projector thus impinge on the cylindrical screen surface under an angle which approaches a right angle only in the central regions of a cylindrical screen so that only these rays are reflected towards the center. All other rays from the projector impinge on the screen under an angle which decreases gradually towards the ends of the screen. The angle of the incident ray towards the radius forming the perpendicular to the reflecting surface thus gradually increases so that the reflected rays in the lateral screen sectors are no longer reflected towards the area in which the audience is seated but are reflected towards the other portions of the screen producing hot spots and illuminating the shadows of the picture thus decreasing the contrasts between light and shadow and thereby degrading the quality of the picture.

The concentration of the reflected rays on hot spots is considerably improved if the screen is provided with the corrugations 11, 12 because different portions of the corrugations reflect light in different directions; but the corrugations on the other hand add to the scattering of light and produce therefore a more evenly distributed degradation of the picture.

According to the invention the degrading effect of the rays reflected towards the screen is avoided by making that portion of each corrugation which would reflect light towards the screen non-reflecting.

It will be observed that the expedient used according to the invention is only possible if portions reflecting towards the screen and portions reflecting towards the audience are distributed evenly over the screen and alternate so that the non-reflecting portions can receive the shape of narrow strips between reflecting portions and therefore cannot disturb the impression produced by the picture.

As will be observed from FIGURE 1 in each corrugation 11 a portion 15 is found reflecting light received from the projector towards the space occupied by the audience seated on both sides of the central plane of symmetry; from another portion 16 on each corrugation the light from the projector is reflected in the direction of the screen itself. By making the latter portions non-reflective the active and useful potrions of the reflected light is preserved while the reflection of disturbing light is suppressed.

As clearly seen in FIGURE 1 the light absorbing sections of the corrugations vary in size and location theoretically from corrugation to corrugation. In the central portion of the screen the central portion of each corrugation reflects towards the area occupied by the audience, while in the lateral portions of the screen only the lateral portions of the corrugations are turned towards the projector and reflect in the direction which is desired while the central portion of the corrugation is ineffective or reflects towards the screen itself.

That portion of the corrugated surface which reflects towards the space occupied by the audience is however still larger than the simple circular cylindrical surface of the screen and the screen surface is thus as efficient or even more efficient than a screen with a smooth circular cylindrical surface.

The surfaces 16 of the corrugations which reflect light towards the screen itself may be made light absorptive by painting them with a light absorbing paint, for instance with black paint. However light absorption can also be obtained in many other ways.

The surfaces of the corrugations which have to be light absorptive can be treated during the manufacturing process of the screen. The location of these light absorbing zones are of course dependent on the width of the screen and on the location of the projection booth relatively to the center of the screen but with these two data the extent of the light absorbing zones is predetermined for every corrugation and may be marked thereon so that in the case of painting for instance the paint can be placed there in advance.

Conversely the screen may be manufactured of light absorbing material and can afterwards be silvered or provided with a light reflecting surface only along those sections which reflect in the desired direction towards the audience.

The corrugations must be of exact design and it is preferred to make all corrugations alike. Preferably they are as wide as they are high, but they may somewhat deviate from this shape. If much wider than high they cannot distribute the light evenly and near the ends of the screen the sides of the corrugations which are operative are at an unfavorable angle causing poor picture reception at the lateral extremes of the theatre. The actual height of the corrugations in some tested screens was ¼″. But this size may vary considerably. This figure mentioned will however show the degree of exaggeration of the scale in the drawing.

Figure 2:
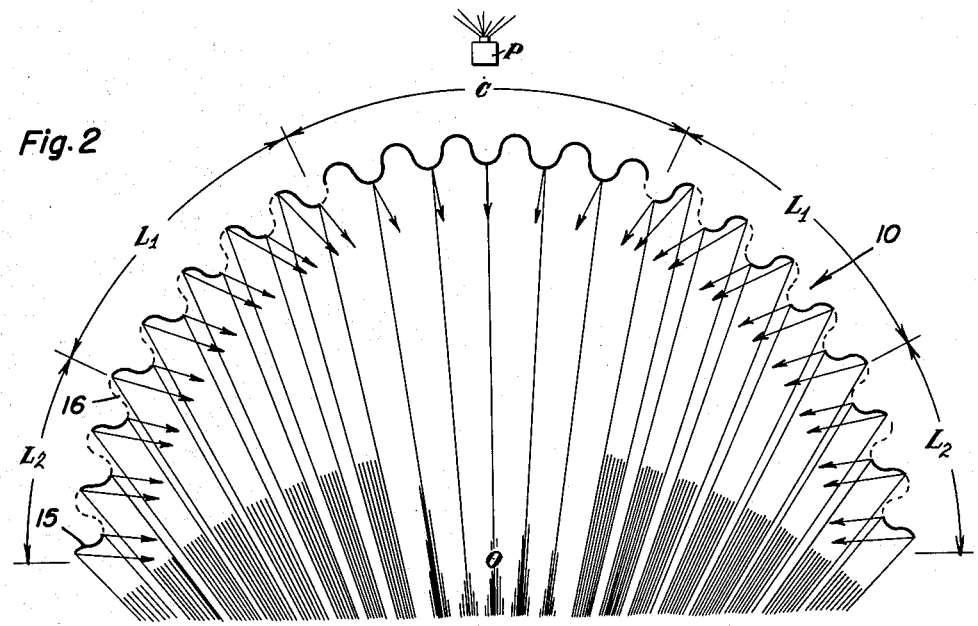
FIGURE 2 illustrates a similar screen which has been divided into sections, the corrugations of each section being treated approximately in the same way with respect to the covering of parts with light absorbing material throughout the section. This distribution of the light reflecting and light absorbing portions corresponds to the average distribution within the section.

For the purpose of manufacturing a screen and in order to use the most effective manufacturing methods it is possible to sectionalize the screen and to treat the corrugations in each section alike. Three, five or more sections may be provided, for instance, a central section C and two lateral sections L1 and L2 on each side. Such a sectionalized screen is illustrated in FIGURE 2. As will be seen the deviation of the extent of the zones 15 and 16 which are reflecting and non-reflecting in the sections L1 and L2 respectively from the individually treated zones shown in FIGURE 1 is only slight.

Figure 3:
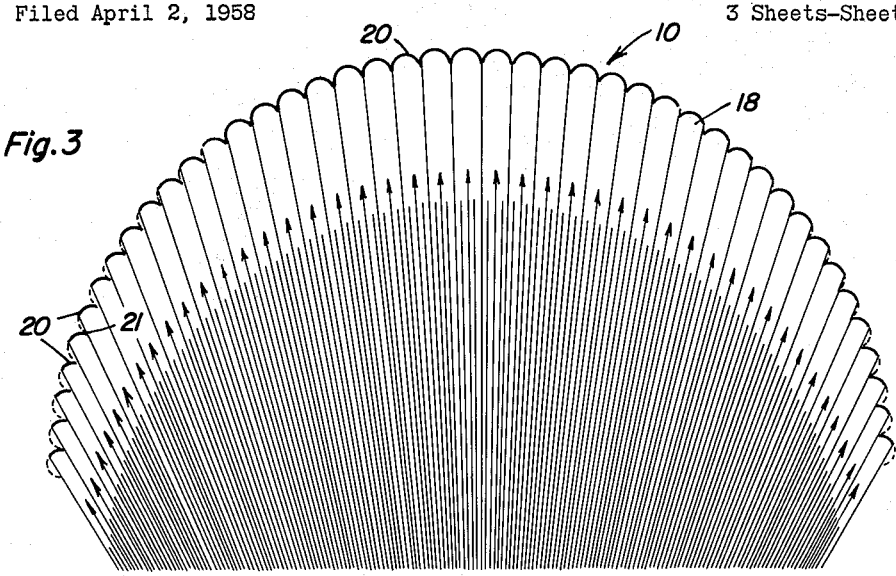
FIGURES 3 and 4 are sectional plan views showing cylindrical screens which are "scalloped," the screen being provided with corrugations the convex side of which is turned towards the same side.
Figure 4:
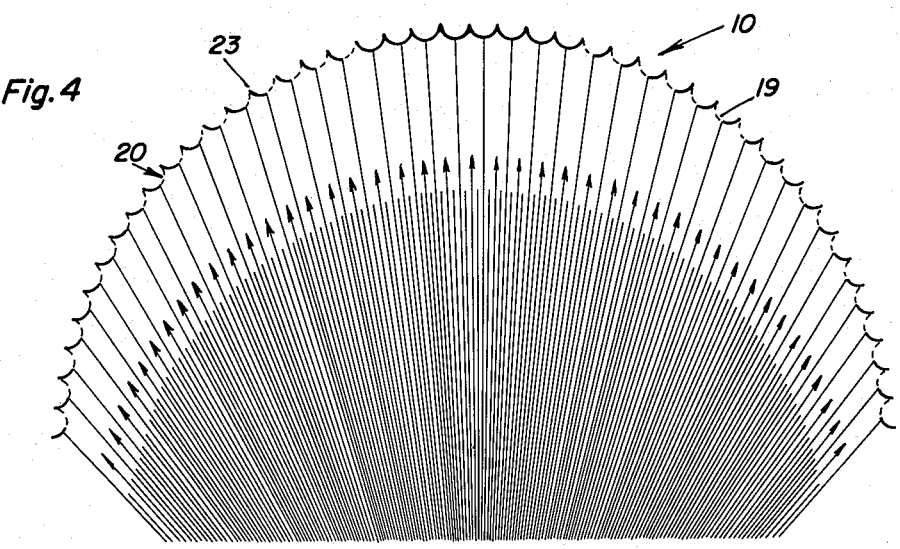

Instead of providing corrugations of the type shown in FIGURES 1 and 2, corrugations of other shapes may be used provided that these corrugations are small and are distributed over the entire screen. FIGURES 3 and 4 show "scalloped" screens in which corrugations of halfwave shape or of semi-circular shape are provided with the apices of all the half waves turned towards the same side. FIGURE 3 shows a scalloped screen with semicircular corrugations 18, the convex side of which is turned towards the outside, while the concave side is turned towards the inside. Where the contiguous corrugation join a crest 21 facing the inside is formed. FIGURE 4 shows a scalloped screen with corrugations 19, the convex side of which is turned towards the inside, while the crests are turned outwardly.

Again according to the invention those portions of each corrugation which reflect towards the inside and are designated by 20 are made light absorptive by painting them with a light absorptive paint or by other means. Both screens permit to obtain very good results with a total reflecting area, which is considerably larger than the area of a simple cylindrical surface.

Figure 5:
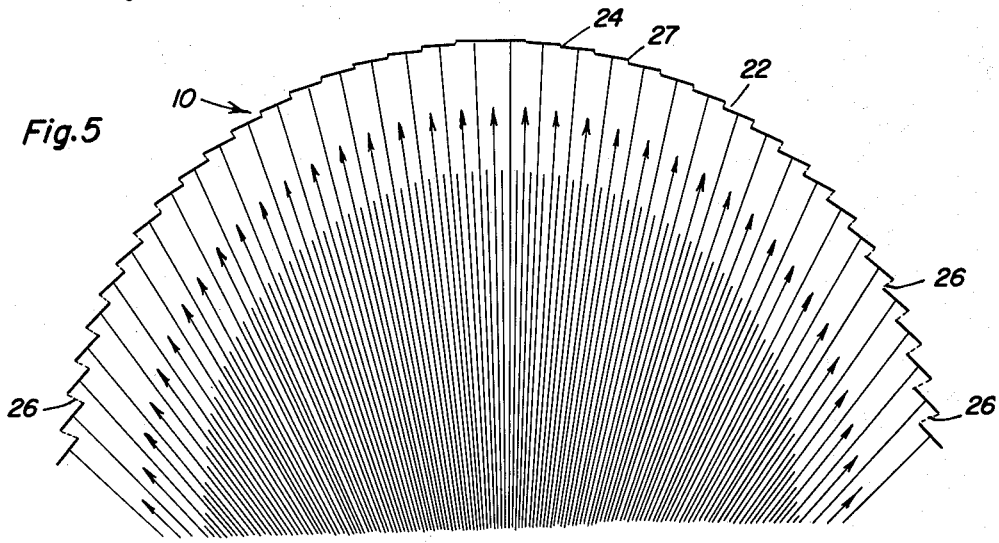
FIGURE 5 shows a modification in which the screen instead of being scalloped or provided with semi-circular corrugations is provided with straight faced triangular ratchet teeth-like corrugations.

To increase the reflecting surface the corrugations of the screen may adopt a triangular shape similar to ratchet teeth, in cross section, as shown in FIGURE 5. Preferably these triangular ratchet teeth corrugations 24 are however of different height, the height increasing when proceeding from the center towards one of the edges of the screen as is clearly seen from FIGURE 5 where the height of the teeth 27 in the center is much smaller than the height of the teeth 26 near the end of the screen. The steps forming the front portion of the ratchet teeth thus likewise increase steadily so that the reflecting portion of the teeth towards which the rays from the projector are directed does not decrease proportionately when proceeding from the center towards the end, but is more nearly constant and so inclined that it substantially reflects the rays in every section of the screen towards the space in which the audience is seated. The front or stepped portion 26 is painted with light absorbing paint or made light absorptive in other ways. It will be noted that the reflecting portions of the teeth in this case are planar and that the teeth-like corrugations can be so arranged that all the planar surfaces are facing the projector and therefore reflect toward the space occupied by the audience.

The increase of the scrren surface in this case is smaller than the increase produced by cylindrical corrugations, but the proportion of the surfaces reflecting towards the space in front of the screen and reflecting towards the screen is more favorable.

Figure 6:
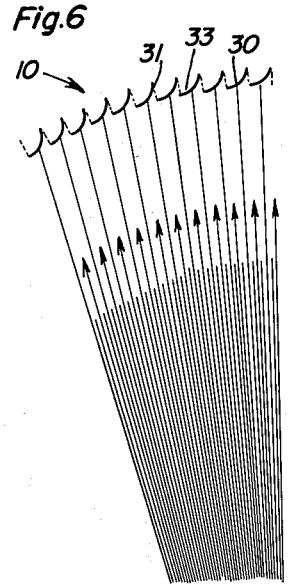
FIGURES 6, 7 and 8 show various forms of intermediate shapes of corrugations usable in this connection showing teeth with a straight front and a curved back. In all figures the reflecting portion of the screen corrugations is shown in heavy lines while the non-reflecting portion of the corrugations of the screen is indicated by dotted lines.
Figure 7:
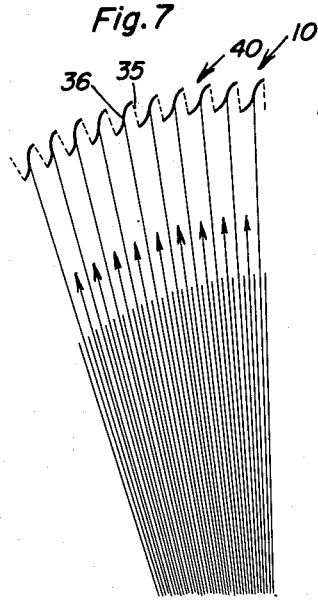
Figure 8:
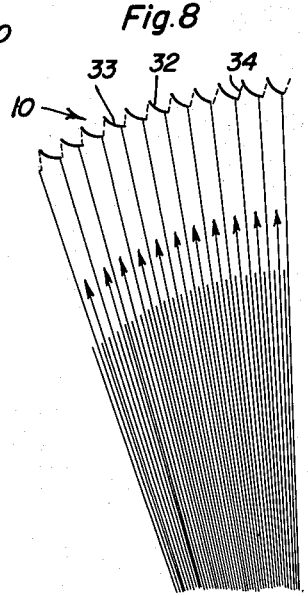

FIGURES 6 to 8 show teeth shaped corrugations 30, 32, 35 respectively of different forms. FIGURE 6 shows teeth-like corrugations 30, the back 33 of which is formed as a quadrant of a circle in cross section while the stepped front portion 31 of the teeth is planar. In FIGURE 6 the planar fronts 31 of the teeth are essentially radially directed and are all turned towards one direction. In FIGURE 8 the front 34 of similar teeth-like corrugations is inclined towards the radial direction and may be slightly curved if desired.

A sectional screen may be constructed with sections having teeth-like corrugations such as shown in FIGURE 6 and sections having teeth-like corrugations the front of which looks in the opposite direction. Obviously, when proceeding from the center towards one end of a screen, teeth-like corrugations such as shown in FIGURE 6 are of advantage, while teeth with front portions facing in the opposite direction may be used on the other side of the screen.

In a screen such as shown in FIGURE 6, the back 33 of the teeth is the reflecting portion in the center and on the right side of the screen, while on the left side of the screen the front side 31 of the teeth-like corrugations are non-reflecting. To avoid this the left side of the screen may be replaced by corrugations such as above explained, with teeth having front sides 31 facing the other way.

FIGURE 7 shows similar teeth-like corrugations 40 which are so shaped that the space between the teeth is approximately equal to the space occupied by the cross section of the teeth. The teeth are thus spaced more evenly. Again the front side 35 of the teeth is made light absorptive by paint or by using a light absorbing material and the backs 36 of the teeth are made partially reflecting.

Other shapes of the corrugations may be used which are equally effective.

It will thus be seen that it is not so much the shape of the corrugations or their curvature in detail which produces the desired effect but the fact that the cylindrical surface, instead of following a circular guiding line follows a wavy or zigzag or a similar line which provides a number of corrugations, teeth, projecting ridges or grooves each of which has a surface facing in different directions, these corrugations being substantially regularly and preferably evenly distributed over the whole cylindrical surface. The surfaces of each small corrugation thus present to the projector rays surfaces which partly reflect towards the space in front of the screen and partly would reflect in other directions if the reflection from the last named portions of the corrugation were not eliminated by covering the surfaces of these portions with light absorptive material. The important feature of the invention is therefore that these surfaces which are made light absorptive are more or less regularly distributed over the entire screen instead of being concentrated in certain parts of the screen so that the light absorptive surfaces have only the shape of narrow strips embedded between the reflecting zones which are also strip-like. The sum total of reflecting surface is however in most cases still larger than the surface of the simple cylindrical screen so that the screen as a rule is as effective as a simple cylindrical screen and in many cases may be more effective. The subdivision of each inwardly and/or outwardly projecting corrugation into zones or strips reflecting rays coming from the projector towards the space in front of the screen, and into non-reflecting strips suppressing reflections is therefore to be considered as part of the essence of the invention and changes of a minor nature such as those related to the form of the corrugations or the way in which the light absorptive condition is produced are therefore not to be considered as essential parts of the invention as defined in the annexed claims.

What is claimed as new is as follows:

1. A reflecting projections screen with a projection image receiving concave surface arranged along a continuous curve, adapted to be positioned in front of a projector emitting a projection beam and in front of a viewing space located on both sides of a central ray of the projection beam, said projector being located at a greater distance from the receiving surface of the screen than the viewing space, and said distance being larger than any radius of curvature of the screen in a horizontal plane, corrugations along said continuously curved projection image receiving surface of the screen, the surface of which is exposed to the light rays of the projection beam, said corrugations being each continuous and unbroken from end to end of the screen and being each of uniform width throughout its length, said corrugations having reflecting and non-reflecting surfaces separated by the line longitudinally thereof and along opposite sides of which an incident ray is reflected and non-reflected respectively and on the reflecting side of which the incident rays of the projection beam impinge on the surface of the corrugation under an angle of incidence entailing reflection towards the viewing space, while on the other side of said line the rays impinge on the surface of the corrugation under an angle of incidence of the beam which is of such size that the rays would be reflected towards a portion of the screen, such reflection being prevented by the non-reflecting character of this side of the surface of the corrugation, the extension of the reflecting portions of the corrugations in a direction at right angles to a central ray of the projection beam being larger than the extention of the non-reflecting surfaces in the same direction so that the sum total of the reflecting surfaces of the corrugations, when viewed from the viewing space, present a substantially continuous screen projection surface.

2. A curved cylindrical projection screen as claimed in claim 1, wherein the corrugations themselves and the reflecting and non-reflecting surfaces of said corrugations are parallel to the axis of the cylinder along which the screen is curved, the reflecting and non-reflecting surfaces of the corrugations thus forming strips alternating with each other and all parallel to the axis of the cylindrical screen.

3. A curved projection screen as claimed in claim 1, wherein the screen is provided with evenly distributed corrugations of the same shape along its curved surface and is divided into sections, the non-reflecting and the light reflecting portions of the corrugations within each section being of equal delineation, corresponding to the average distribution of light reflecting and non-reflecting portions within the section.

4. A curved cylindrical projection screen as claimed in claim 1, wherein the continuous screen surface is provided with a large number of evenly distributed, adjacent curved corrugations, each portion of the corrugation which is non-reflecting being enclosed between portions of the same or of an adjacent corrugation which are light reflecting, reflecting and non-reflecting portions of the surface of the corrugations thus alternating and forming strips of different widths which are parallel to the axis of the cylindrical screen, the width of the strips formed by the non-reflecting portions, when viewed in the direction of the rays of the projection beam, being a fraction of the width of the reflecting portion when viewed in the same direction, so that the total area of the reflecting portions is very nearly a continuous cylindrical projection surface when viewed from the viewing space.

5. A curved portion screen as claimed in claim 1, wherein the corrugations are of sinusoidal shape and are of approximately equal depth and width.

6. A curved screen as claimed in claim 1, wherein the corrugations are semi-circular and projecting inwardly and outwardly, thus producing a wavy continuous screen surface.

7. A cylindrical projection screen as claimed in claim 1, wherein the corrugations are semi-circular and wherein adjacent semi-circular corrugations project toward the same side thus forming a continuous scalloped projection surface.

8. A cylindrical projection screen as claimed in claim 1, wherein the corrugations are ratchet teeth-like in cross-section and are provided with a curved back section, and a substantially straight front section.

References Cited in the file of this patent
UNITED STATES PATENTS

| | | |
|---|---|---|
| 1,550,880 | Clark | Aug. 25, 1925 |
| 1,867,199 | Wildhaber | July 12, 1932 |
| 2,273,074 | Waller | Feb. 17, 1942 |
| 2,476,521 | Waller | July 19, 1949 |
| 2,804,801 | Mihalakis | Sept. 3, 1957 |
| 2,828,667 | Grossman | Apr. 1, 1958 |